No. 814,981. PATENTED MAR. 13, 1906.
F. C. NEWELL.
ELECTRIC HEATING SYSTEM FOR CARS.
APPLICATION FILED JAN. 5, 1900.
3 SHEETS—SHEET 1.
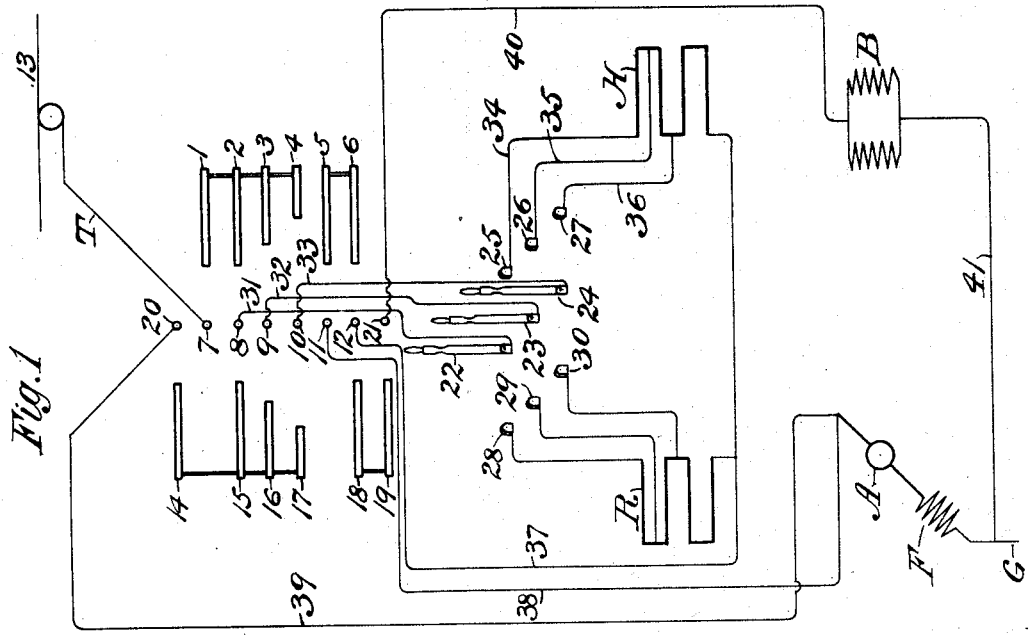
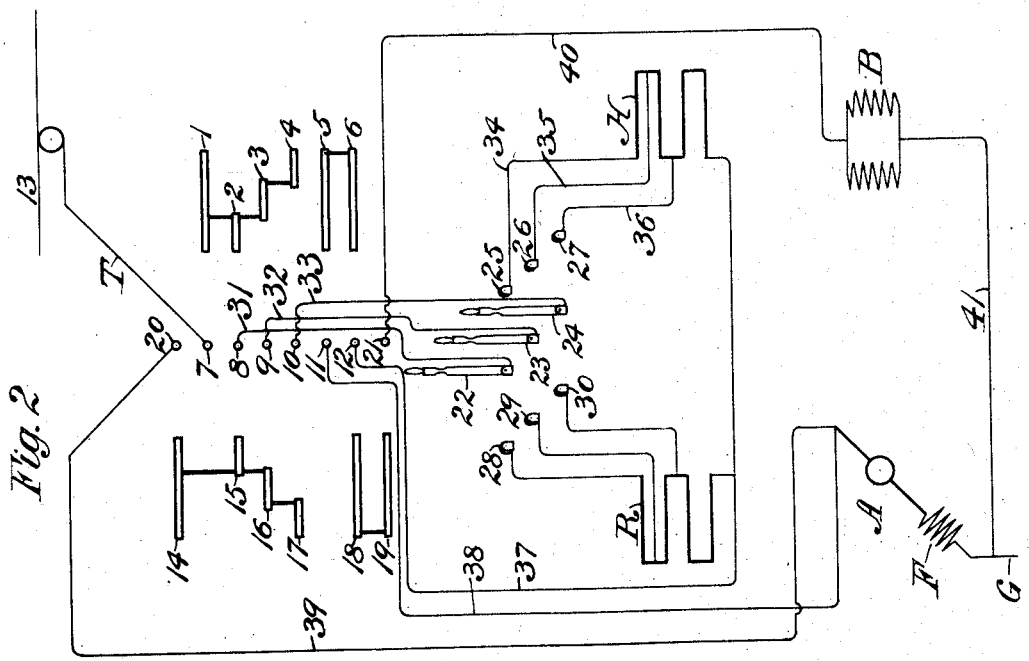
WITNESSES:
INVENTOR,
Frank C. Newell,
by T. J. Hogan, Att'y.

No. 814,981. PATENTED MAR. 13, 1906.
F. C. NEWELL.
ELECTRIC HEATING SYSTEM FOR CARS.
APPLICATION FILED JAN. 5, 1900.
3 SHEETS—SHEET 2.
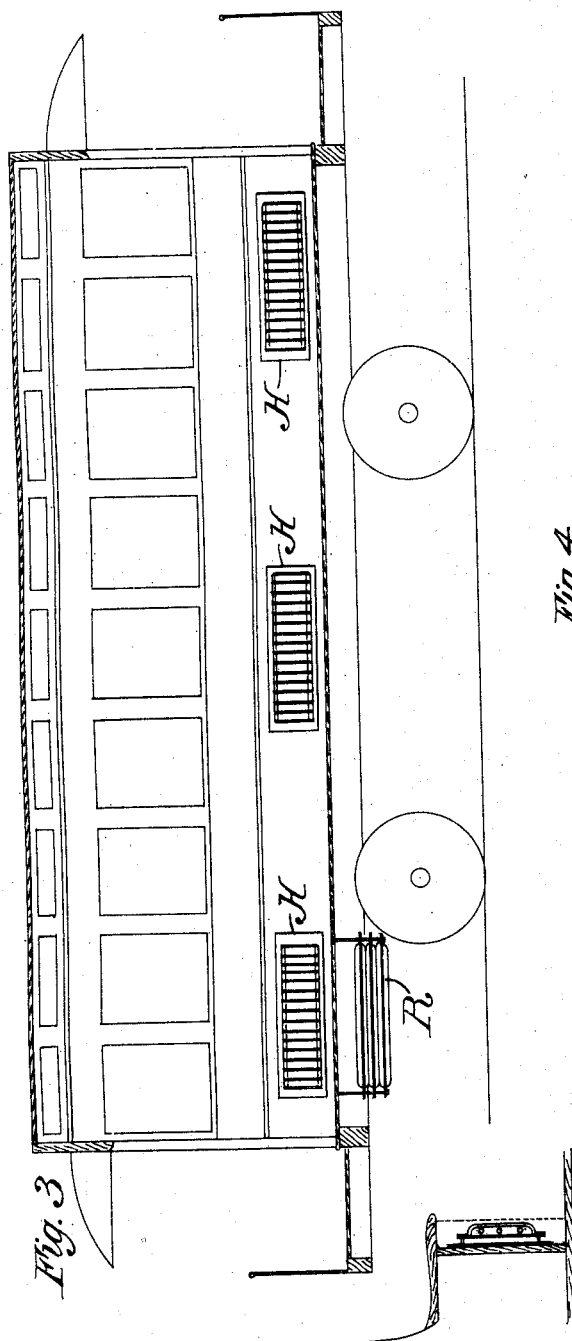
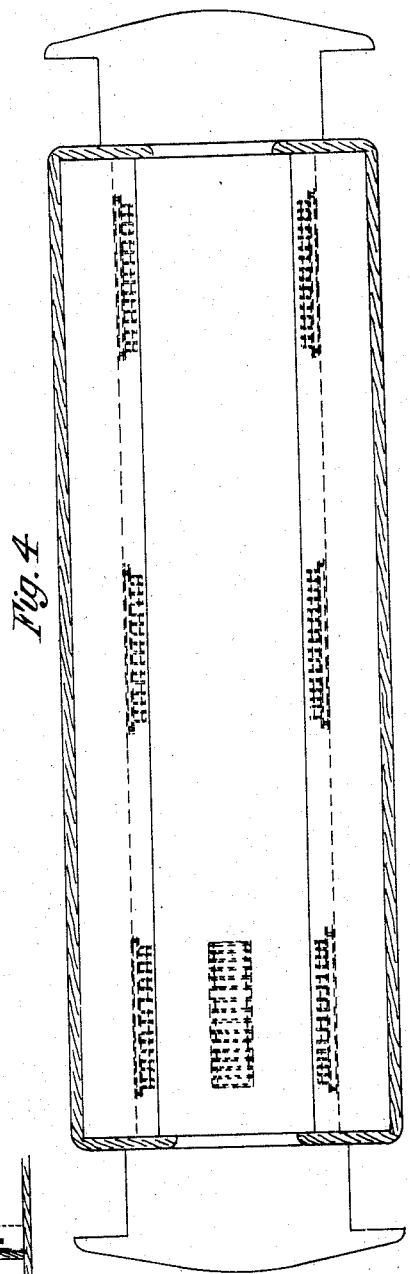
WITNESSES:
INVENTOR,
Frank C. Newell,
by T. J. Hogan, Att'y.

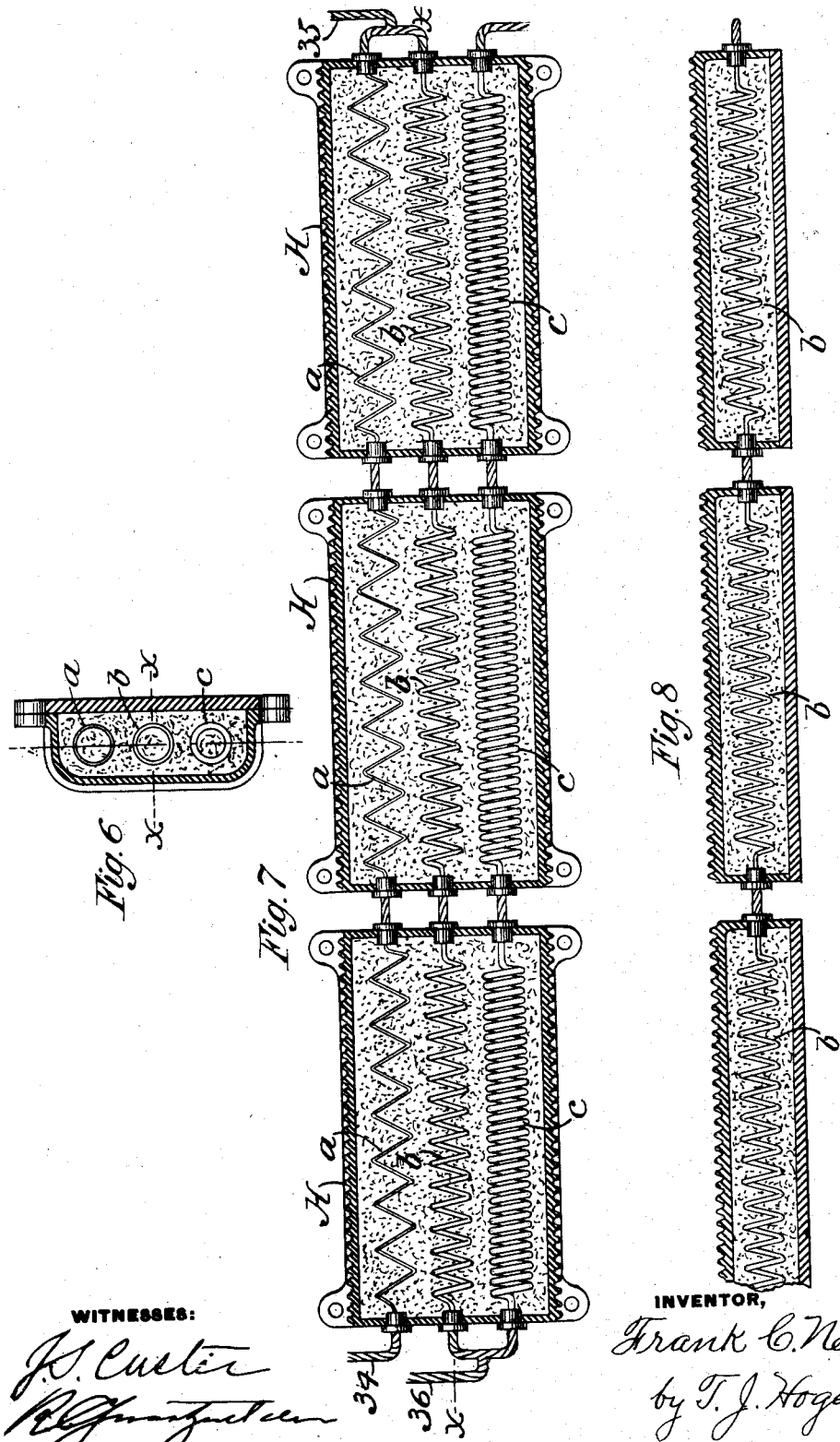

UNITED STATES PATENT OFFICE.

FRANK C. NEWELL, OF WILKINSBURG, PENNSYLVANIA, ASSIGNOR TO THE WESTINGHOUSE AIR BRAKE COMPANY, OF PITTSBURG, PENNSYLVANIA, A CORPORATION OF PENNSYLVANIA.

ELECTRIC HEATING SYSTEM FOR CARS.

No. 814,981.     Specification of Letters Patent.     Patented March 13, 1906.

Application filed January 5, 1900. Serial No. 472.

*To all whom it may concern:*

Be it known that I, FRANK C. NEWELL, a citizen of the United States, residing at Wilkinsburg, county of Allegheny, State of Pennsylvania, have invented or discovered a certain new and useful Improvement in Electric Heating Systems for Cars, of which improvement the following is a specification.

My invention relates to a system for heating and controlling electric cars.

In the stopping and starting of electric cars the resistance device or rheostat is operated by the controller at frequent intervals to control the supply of current to the motors, thus providing a large amount of waste heat in the resistance-coils. Also when the line-current is cut off and the motors are connected to act as generators in a local circuit by the momentum of the car a large amount of heat is wasted in the resistance device or rheostat used to control the current in the local circuit. This current varies greatly during the period that the car is coming to a stop, being very heavy at first and rapidly reducing down to zero as the car comes to a standstill.

The object of my invention is to provide a new and improved system for heating and controlling electric cars in which this waste heat is utilized for warming the interior of the car and also to provide a heater which is adapted at the same time to serve as the resistance device or rheostat for the controller in starting and stopping the car.

In order to provide a combined electric heater and rheostat which will properly regulate the current in the motor-circuit and in the braking-circuit and at the same time utilize such current for heating purposes in the car, I construct a device having a series of resistance-coils of different cross-sectional area and current-carrying capacities and means for varying the connections of the different coils in the circuit, so as to increase or decrease the strength of the current, as desired. The cross-sectional area and length of each of the resistance-coils is so proportioned that the maximum current which each coil is designed to carry in order to secure a certain action of the motor or a certain braking action will at the same time produce a certain temperature in said coil which will be efficient for heating purposes. The coils are embedded in an insulating and heat-storing substance, so that the heat may be rapidly absorbed or stored during the short and intermittent periods in which the coils are supplied with current and may be radiated gradually at all times to warm the interior of the car.

In the accompanying drawings, which illustrate an application of my invention, Figure 1 is a diagram illustrating the electric circuits employed in starting and running and in stopping an electrically-operated car and the connections for utilizing the electric current in accordance with my invention; Fig. 2, a diagram showing a modification of the contact-bars of the controller by means of which portions of the resistance instead of being shunted may be successively cut out; Fig. 3, a longitudinal vertical section, and Fig. 4 a horizontal section, through a car, showing the location of the heaters inside of the car and the rheostat under the car; Fig. 5, a transverse section through a car-seat and through one of the heaters; Fig. 6, a vertical transverse section, and Fig. 7 a vertical longitudinal section, on an enlarged scale, showing the interior construction and arrangement of the heaters; Fig. 8, a horizontal section on the line $x$ $x$ of Figs. 6 and 7.

My invention provides means whereby when the motor or motors on an electrically-operated car have been cut off from the trolley-line and connected in a local circuit on the car, so as to act as generators to produce a current for braking purposes, all or any portion of the current so generated may be passed through heaters inside of the car for the purpose of heating the car, or a portion of the current may be diverted so as to pass through a rheostat or resistance device on the outside of the car, and in combination with such means for utilizing the braking-current I employ means whereby the current from the trolley-line may be similarly utilized and regulated in starting the car or when current is being supplied to the motor or motors.

As shown in Fig. 1 of the drawings, a controller is employed having contact-bars 1, 2, 3, 4, 5, and 6 for engaging with the contact-points 7, 8, 9, 10, 11, and 12 when the controller is turned in one direction and current is being supplied to the motor or motors from the main line 13 through the trolley connection T, and other contact-bars 14, 15, 16, 17, 18, and 19 are adapted to engage with the contact-points 20, 8, 9, 10, 12, and 21 when the controller is turned in the opposite direction and the motor or motors are cut off from the main line and connected in a local circuit for braking purposes. The resistance devices employed when starting or running the car and for braking purposes may be all or a part of the coils of the heater H, which is located within the car or any of the coils of the rheostat R, which is located under the car, the connections being in accordance with the heating effect desired, and for the purpose of connecting either, as may be desired, I provide the switches 22, 23, and 24, which are adapted when turned to the right to make contact, respectively, with the points 25, 26, and 27, which are connected with the heater, and when turned to the left to make contact, respectively, with the points 28, 29, and 30, which are connected with the rheostat under the car, the switch 22 being employed to make contact with the point 25 or the point 28 when it is desired that the resistance should be a maximum and the switches 23 and 24 being employed to make contact with their respective points when it is desired that the resistance be somewhat less, the controller being at the same time in the proper position to send the current through the desired resistance by engagement of the contact-bars 2, 3, or 4 with the points 8, 9, or 10, respectively, when starting or running and by engagement of the contact-bars 15, 16, or 17 with the points 8, 9, or 10 when the local circuit for braking purposes is closed.

When the controller is turned to the left for the purpose of connecting the motor with the trolley-line, the contact-bar 1 will make contact with the contact-point 7, and the contact-bar 2, which is electrically connected with the bar 1, will make contact with the point 8, and the current from the main line will pass through the trolley connection and bars 1 and 2 and the wire 31 to the switch 22, and if it is desired to heat the car the switch 22 should be in position to make contact with the point 25, so that the current will pass through the wire 34 and through all of the coils in the heater H. At the same time that the trolley connection is closed by contact of the bar 1 with the point 7 the points 11 and 12 are electrically connected by contact with the bars 5 and 6, and the current after passing through the heater flows through the wire 37, bars 6 and 5, and through the wire 38 to the motor, the armature of which is represented by the circle A and the field of which is represented by the coil F. After passing through the motor the current is grounded at G. A further movement of the controller to the left for the purpose of reducing the resistance will put the bar 3 in contact with the point 9, and the current will then pass through the wires 31 and 32 to the switches 22 and 23, which should be at that time in contact with the points 25 and 26 if it is desired to utilize all of the current for heating the car, or otherwise one or both of the switches 22 and 23 should be turned to the left, so as to make contact with one or both of the points 28 and 29, so that the current may flow partly or wholly through the rheostat R. A still further movement of the controller to the left will further decrease the resistance by making contact between the point 10 and the bar 4, so as to send a part of the current through the wire 33 to the switch 24, which should be in contact with the point 27 or with the point 30.

In order to cut off the current from the trolley-line and apply the brakes, the controller is turned to the right, so as to break the contact of the point 7 with the bar 1 and to make contact between the point 20 and the bar 14 and between the point 8 and the bar 15. The motor or motors will then be operated by the momentum of the car as generators, and the current from the motor flows through the wire 39 to the contact-point 20 and thence to the bar 15 and the point 8 and through the wire 31 to the switch 22, which should be in contact with the point 25 if the current is to be utilized for heating the car. The current will then flow through all of the coils in the heater and through the wire 37 to the contact-point 12 and through the connected contact-bars 18 and 19 and contact-point 21 and wire 40 to the brake-magnet B and through wire 41 to the motor. When the controller is moved further to the right, the bar 16 makes contact with the contact-point 9 and the current from the motor acting as a generator flows through the wires 31 and 32 to the switches 22 and 23, which should be in contact with the points 25 and 26 in order to pass all of the current through the heater within the car. A further movement of the controller to the right will put the contact-bar 17 in contact with the point 10, so that the current will flow through the wires 31, 32, and 33 to the switches 22, 23, and 24, and if the switches are in contact with the points 25, 26, and 27 the current will flow through all of the coils of the heater.

While I have shown but three switches and a corresponding number of contact-points for cutting in or out the resistance and for making the desired connections by movement of the controller, my improvement is not limited to any particular number of switches or contact-points or bars, but the construction may be varied in accordance with any desired variation in the resistance.

As shown in Fig. 2 of the drawings, the contact-bars 2, 3, 4, 15, 16, and 17 are modified, so as to permit of a portion of the resistance being cut out instead of being shunted. With this construction when the contact-bars 1 and 2 are in contact with the points 7 and 8 and the switch 22 is in contact with either of the points 25 or 28 the current will pass through all of the resistance in the heater or all of the resistance in the rheostat under the car, and on a further movement of the controller to the left, which brings the contact-bar 3 in contact with the point 9, the current may pass to both of the switches 22 and 23, if the bar 2 be not disengaged from the point 8 by this movement, or if the movement to the left be great enough to disengage the bar 2 from the point 8 the current will flow only to the switch 23, which should be in contact with the point 26 or with the point 29. A further movement to the left sufficient to cause the bar 4 of Fig. 2 to make contact with the point 10 may permit the current to flow to both of the switches 23 and 24 or only to the switch 24 if the movement be great enough to disengage the bar 3 from the point 9.

With the construction shown in Fig. 2 when the controller is turned to the right for the purpose of disconnecting the motor or motors from the main line and connecting the motor or motors in the local circuit for braking purposes the contact-bar 14 makes contact with the point 20 and the bar 15 makes contact with the point 8, so as to at first cut in all of the resistance either through the heater or through the rheostat under the car, depending on the position of the switch 22—that is, whether it is in contact with the point 25 or the point 28—and further movement of the controller to the right, which brings the bar 16 in contact with the point 9, may permit the current to flow to both switches 22 and 23, if the contact of the bar 15 with the point 8 be not broken, or if the movement be great enough to break the contact of the bar 15 with the point 8 the current will flow to the switch 23 only. Similarly, a further movement to the right, which brings the bar 17 in contact with the point 10, may or may not be sufficient to cause the bar 16 to break contact with the point 9, and the current may flow to both of the switches 23 and 24 or only to the switch 24, depending on the extent of the movement of the controller to the right.

For the purpose of heating the interior of the car the heat-developing conductors or resistance-coils are preferably arranged in separate boxes or casings H, which are located under the edges of the seats at intervals in the length of the car and are filled with an insulating and heat absorbing substance in which the coils are embedded. The substance employed for this purpose excludes the air from the coils, and thereby prevents oxidation and is a sufficiently-good conductor of heat to effect the desired storage and transfer of heat from the coils to the casing. The casing is formed of metal and is corrugated on its exposed surface, as shown in the drawings, so as to present a comparatively large radiating-surface.

In Fig. 7 of the drawings I have shown in each of the casings or boxes of the heater three heat-developing conductors or resistance-coils, each coil differing in cross-sectional area from that of each of the other coils in the same box. The uppermost coils $a$ in the different boxes are made with the least cross-sectional area, the middle coils $b$ of somewhat greater cross-sectional area, and the lowest coils $c$ of still greater cross-sectional area. The upper coils $a$, all having the same cross-sectional area, are connected in series, as shown in Fig. 7, so that the current after passing through the coil $a$ in the first box flows into and through the coil $a$ in the second box and then into and through the coil $a$ in the third box. The coils $b$ and $c$ are similarly connected, so that the current flows through all of the coils $b$ in succession and then through the coils $c$.

When the controller is in position to make contact between the point 8 and either of the contact-bars 2 or 15, so as to send the current through the switch 22 and wire 34, the switch 22 being then turned to the right, so to make contact with the point 25, the current will flow first through all of the coils $a$ and produce a heating effect in each of the boxes by heating the coils $a$ to a temperature which will depend upon their length and cross-sectional area—for example, such a temperature as will produce redness of the resistance-coils. The current after passing through coils $a$ will flow through the coils $b$, heating them to a temperature somewhat below that of the coils $a$ and producing a heating effect in each of the boxes, and will then pass through the coils $c$, where the temperature will be still less.

While I have shown the resistance-coils or heat-developing conductors as composed of wire arranged in spiral form, it is to be understood that my invention is not limited to this arrangement, since it is evident that various other forms and shapes of heat-developing conductor—such, for instance, as a crimped flat ribbon—may be used.

With the construction shown in Fig. 1 when the controller is moved so as to cause either of the bars 3 or 16 to make contact with the point 9 if the switches 22 and 23 be in contact with the points 25 and 26 a part only of the current will flow through the wires 31 and 34 and through the coils $a$ and a part will flow through the wires 32 and 35 and be shunted around the coils $a$; but the whole of the current will flow through the coils $b$ and $c$, with the effect that the temperature of the coils $a$ will be reduced; but as the total resistance to the passage of the current is also reduced the current will be greater and the temperature of the coils $b$ and $c$ will be increased.

With the construction shown in Fig. 2 of the drawings, which permits the coils $a$ to be entirely cut out when either of the bars 3 or 16 is in contact with the point 9, the current may be caused to flow through the coils $b$ and $c$ only, and there will then be no heating effect by the coils $a$.

It will be seen by reference to the diagrams Figs. 1 and 2 and the connections to the coils shown in Fig. 7 that the current may be shunted around both the coils $a$ and coils $b$ when the contact-bars 4 or 17 make contact with the point 10 or that both the coils $a$ and the coils $b$ may be entirely cut out. In either case the increase in the quantity of the current due to the decrease in the resistance will cause an increase in the temperature of the coils $c$ and a corresponding increase in the heating effect of the coils.

By means of my improvement I am enabled to employ the current generated in the local braking-circuit by the momentum of the car for the purpose of heating the interior of the car, and thereby provide an economical heating system in which a large amount of energy converted into heat and which has heretofore been wasted may be utilized.

I claim as my invention and desire to secure by Letters Patent—

1. The combination on a car of an electric motor for propelling the car, a running or motor circuit for supplying current to the motor, a local brake-circuit containing a brake-magnet, an electric heater located within the car and having a series of coils of different resistance capacity for regulating the current in both circuits, and controlling switch mechanism having contact-points for varying the connections of the heater-coils in the running-circuit and other contact-points for connecting up the motor to act as a generator in the local brake-circuit and for varying the connections of the heater-coils in said brake-circuit.

2. The combination on an electric car, of a motor, a motor-circuit for supplying current to the motor, a local brake-circuit, an electric heater located within the car and having a series of coils of different cross-sectional area for regulating the current in both circuits, and switch mechanism for cutting out the motor-circuit, connecting up the motor to act as a generator in the local brake-circuit with the heater and varying the connections of the heater-coils in said local circuit.

3. The combination on an electric car, of a motor, a motor-circuit for supplying current to the motor, a local brake-circuit, a controller for cutting out the motor-circuit and connecting up the motor to act as a generator in the local brake-circuit, an electric heater in the car and having a series of coils of different resistances, a rheostat located outside the car and having a corresponding series of coils, and a series of switches for connecting one or more of the coils of either the heater or of the rheostat into the local circuit.

4. The combination, on an electric car, of a motor for propelling the car and also adapted to be operated as a generator by the momentum of the car when the line-current is cut off from the motor, a local brake-circuit to which current may be supplied by the generator, an electric heater having a series of coils of different cross-sectional area adapted to serve as a rheostat for both the motor-circuit and the brake-circuit, a magnetic brake device in said brake-circuit, and means for varying the connections of the coils of the heater in the running or motor circuit and in the brake-circuit.

5. An electric heater for cars, comprising a plurality of separate casings arranged in series, a plurality of resistance-coils of different cross-sectional area and current-carrying capacity in each casing, the respective coils of the same size in the different casings being connected together in series, and the several sets of coils also being connected in series.

6. The combination on a car of an electric motor for propelling the car, a running or motor circuit for supplying current to the motor, a local brake-circuit containing a brake-magnet, an electric heater located within the car and having a series of coils of different resistance capacity for regulating the current in the brake-circuits, and controlling switch mechanism having contact-points for connecting up the motor to act as a generator in the local brake-circuit and for varying the connections of the heater-coils in said brake-circuit.

In testimony whereof I have hereunto set my hand.

FRANK C. NEWELL.

Witnesses:
T. H. SIBOTHAN,
JAS. B. MACDONALD.